Apr. 17, 1923. 1,452,248

A. E. MILARCH

AUTOMOBILE TRANSMISSION

Filed July 7, 1921 2 Sheets-Sheet 1

Inventor
A.E.Milarch,
By C.A.Snow & Co.
Attorneys

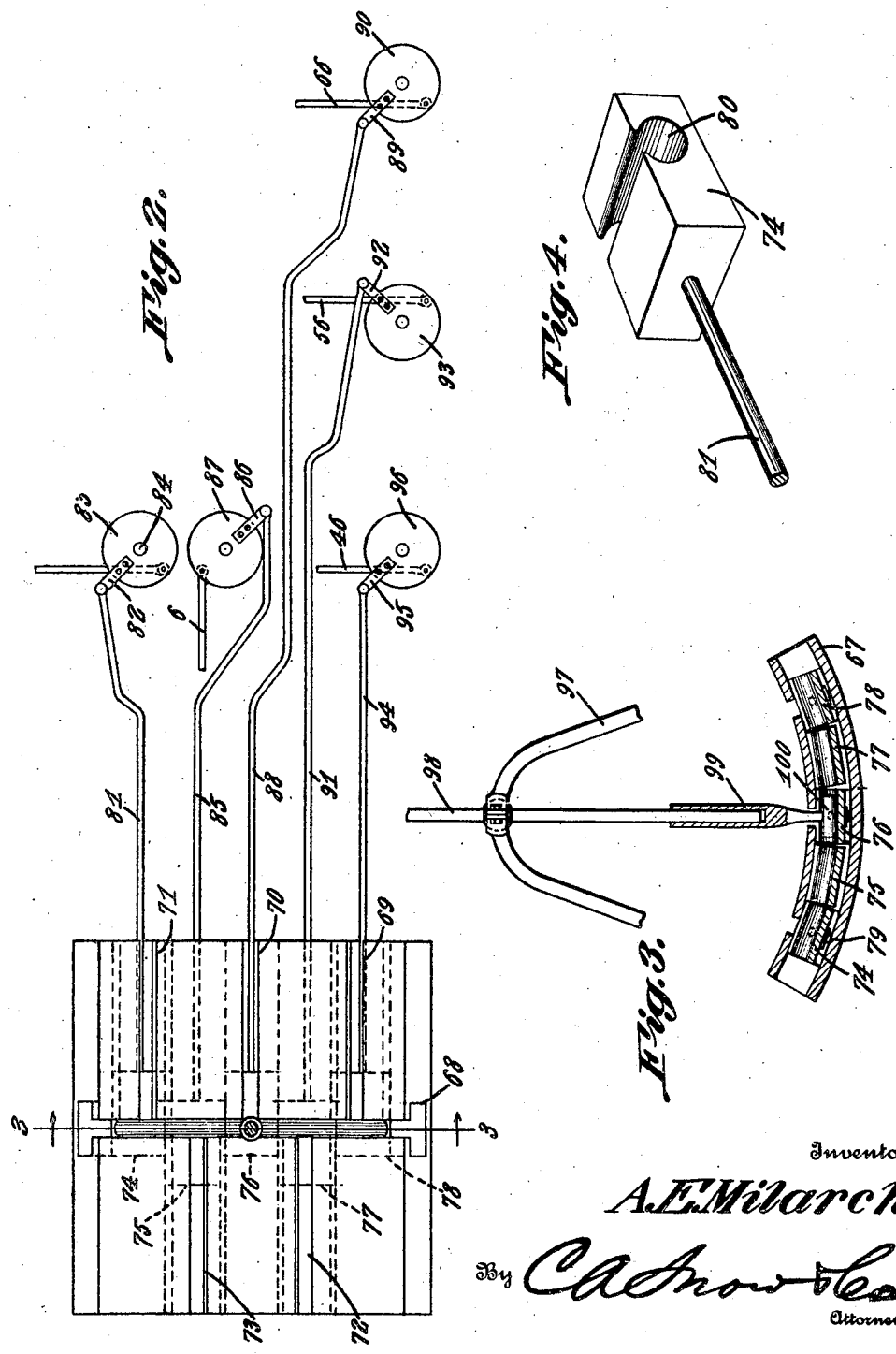

Patented Apr. 17, 1923.

1,452,248

UNITED STATES PATENT OFFICE.

ALFRED E. MILARCH, OF ATLANTA, GEORGIA, ASSIGNOR TO ISABEL AMMON MILARCH, OF ATLANTA, GEORGIA.

AUTOMOBILE TRANSMISSION.

Application filed July 7, 1921. Serial No. 482,976.

*To all whom it may concern:*

Be it known that I, ALFRED E. MILARCH, a citizen of the United States, residing at Atlanta, in the county of Fulton and State of Georgia, have invented a new and useful Automobile Transmission, of which the following is a specification.

This invention relates to transmission mechanism for motor vehicles, one of its objects being to provide mechanism of this character utilizing gears which are at all times properly in mesh, there being a single lever under the control of the driver whereby any one of a series of clutches can be shifted for coupling the drive shaft to selected gears for the purpose of propelling the vehicle at different speeds and backward or forward.

Another object is to provide novel means for transmitting motion from the lever to the various clutches.

With the foregoing and other objects in view which will appear as the description proceeds, the invention resides in the combination and arrangement of parts and in the details of construction hereinafter described and claimed, it being understood that within the scope of what is claimed, changes in the precise embodiment of the invention shown can be made without departing from the spirit of the invention.

In the accompanying drawings the preferred form of the invention has been shown.

In said drawings—

Figure 2 is a plan view of the connections between the shifting lever and the clutch operating rods, said lever being shown in section.

Figure 3 is a section on line 3—3, Figure 2.

Figure 4 is a detail view of one of the slides.

Figure 1:
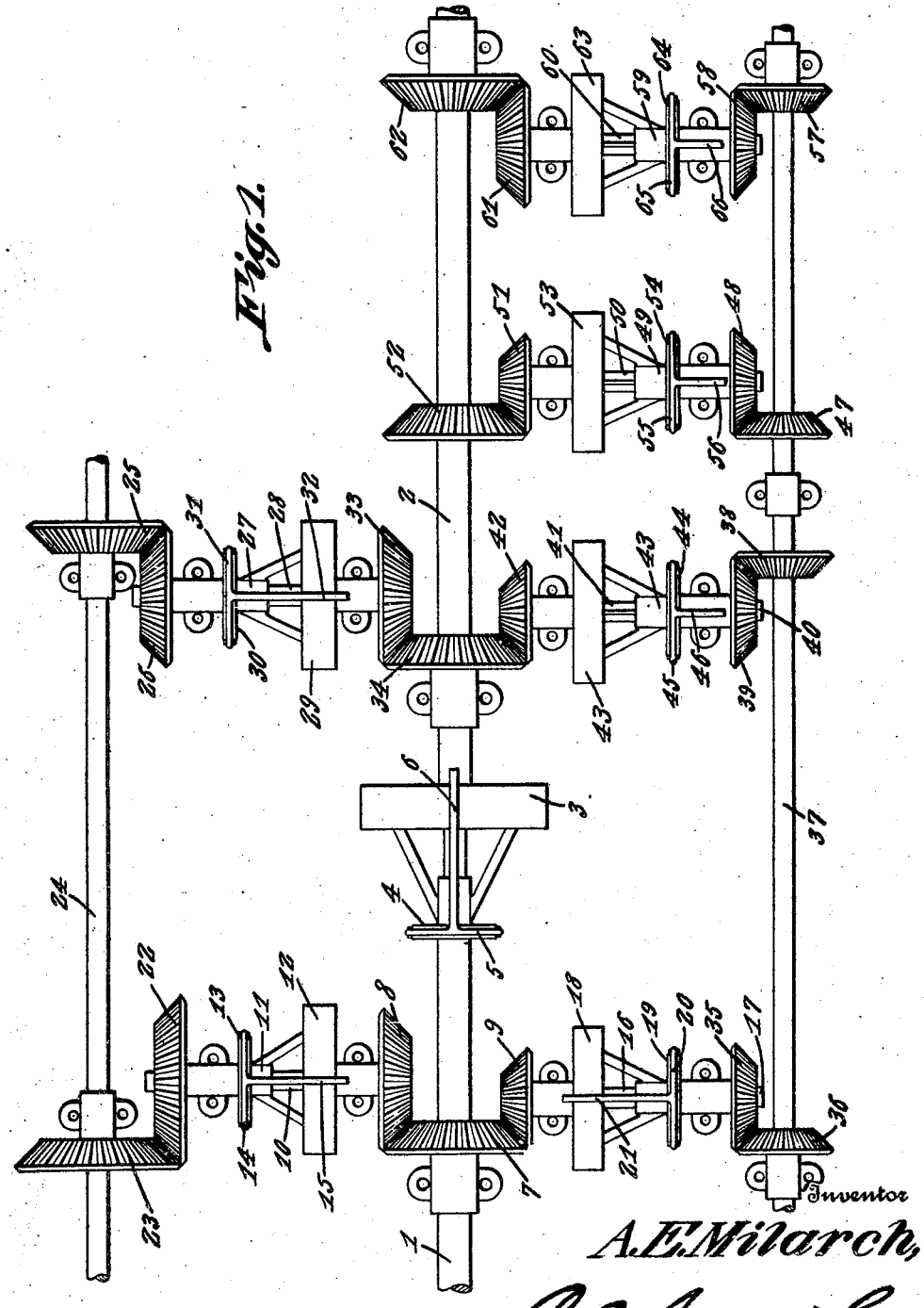
Figure 1 is a plan view of the transmission gearing.

Referring to the figures by characters of reference 1 designates the drive shaft which is aligned with a transmission shaft 2, there being a clutch indicated generally at 3 whereby the two shafts can be coupled or uncoupled at will. This clutch can be of any well known type and includes a slidable ring 4 engaged by a fork 5 at one end of a shifting rod 6. A gear 7 is secured to the shaft 1 and meshes with oppositely disposed gears 8 and 9 of different diameters. Gear 8 is secured to a shaft section 10 aligning with another shaft section 11 and a clutch 12 of any well known type is provided for coupling or uncoupling these sections. This clutch includes a ring 13 engaged by a fork 14 at one end of a shifting rod 15. Gear 9 is secured to a shaft section 16 aligning with another shaft section 17, and a clutch 18 of any well known type is provided whereby the two shaft sections can be coupled or uncoupled. This clutch includes a ring 19 engaged by the forked end 20 of a shifting rod 21.

A gear 22 is secured to the shaft section 10 and is larger than the gear 8. This gear 22 meshes with a gear 23 on a counter-shaft 24 and another gear 25 on the counter-shaft meshes with a gear 26 secured to a shaft section 27. A shaft section 28 aligns with the shaft section 27 and the two sections are adapted to be coupled or uncoupled by means of a clutch 29. This clutch includes a ring 30 engaged by the forked end 31 of a shifting rod 32. A gear 33 is secured to the shaft section 28 and meshes with a gear 34 secured to the transmission shaft 2.

A gear 35 is secured to the shaft section 17 and meshes with a gear 36 secured to a counter-shaft 37. Another gear 38 is secured to the counter-shaft and meshes with a gear 39 secured to a shaft section 40. This shaft section aligns with another shaft section 41 to which is secured a gear 42 constantly meshing with gear 34 and disposed diametrically opposite the gear 33. A clutch 43 serves to couple or uncouple the shaft sections 40 and 41 and includes a ring 44 engaged by the forked end 45 of a shifting rod 46.

Another gear 47 is secured to the counter-shaft 37 and meshes with a gear 48 secured to a shaft section 49. Another shaft section 50 aligns with the section 49 and has a gear 51 secured thereto and constantly meshing with a gear 52 on the transmission shaft 2. A suitable clutch 53 is employed for connecting the two shaft sections 49 and 50 and includes a ring 54 engaged by the forked end 55 of a shifting rod 56.

Another gear 57 is secured to the counter-shaft 37 and meshes with a gear 58 secured to a shaft section 59. This shaft section aligns with a shaft section 60 to which is secured a gear 61 meshing with a gear 62 on the shaft 2. A clutch 63 is employed for coupling or uncoupling the shaft sections 59 and 60 and includes a ring 64 engaged by the forked end 65 of a shifting rod 66.

It will be noted that the gears shown in Figure 1 are so arranged and proportioned that when the clutch 3 is loose and all of the other clutches are likewise uncoupled, the operation of the shaft 1 by the engine will merely result in the rotation of the gears 8 and 9 and their shaft sections 10 and 16 by the gear 7. By shifting the clutches 12 and 18 by means of the usual clutch lever, whereby the rods 15 and 21 are actuated, the gears 35 and 22 will be coupled to the gears 9 and 8 respectively so that motion will thus be transmitted through the gears 36 and 23 to the two counter-shafts 37 and 24. This, however, will not produce any results because the clutches 29, 43, 53 and 63 are not in coupling positions.

Assuming that the clutch lever has been shifted so as to couple the counter-shaft 24 and 37 to the drive shaft 1, it is to be understood that by shifting the clutch 53 the counter-shaft 37 can be coupled through the gears 47, 48, 51 and 52 to the transmission shaft 2, these gears being so proportioned as to drive the shaft at first speed. By shifting the clutch 63 after disengagement of the clutch 53 the shaft 2 can be driven at second speed and by disengaging the clutch 63 and shifting the clutch 43 the rotation of the shaft 2 can be reversed as will be obvious. By uncoupling the clutch 43 and throwing the clutch 3 a direct connection between the shafts 1 and 2 will be effected for attaining the third speed forward and by uncoupling the clutch 3 and shifting clutch 29 the shaft 2 can be driven at fourth speed.

For the purpose of shifting the various clutches of the transmission mechanism, exclusive of the clutches 12 and 18, a novel mechanism such as shown in Figures 2, 3 and 4 is used. This mechanism includes an arcuate plate 67 having a transverse channel 68 the walls of which are undercut as clearly shown in Figure 2. Extending toward one end of the plate 67 from this channel are spaced longitudinal channels 69, 70 and 71 while extending toward the other end of the plate from the channel 68 are longitudinal channels 72 and 73 which are out of alignment with the other channels.

Mounted within the transverse channel 68 is a series of blocks 74, 75, 76, 77 and 78 each of which is provided on its bottom face with antifriction balls 79 or the like while formed within the top face of each of the blocks is a transverse substantially cylindrical groove or channel 80. When the blocks are in their normal positions within the channel 68 these grooves 80 align, as shown in Figure 3 and one of the blocks is positioned at the inner end of each of the longitudinal channels. A rod 81 extends from the block 74 and is connected to a crank arm 82 extending from a disk 83 mounted for rotation about a pivot pin 84 and to this disk is connected the rod 32.

A rod 85 is extended from the block 75 and is connected to a crank arm 86 extending from a disk 87 mounted for rotation. To this disk is connected the rod 6.

A rod 88 is extended from the block 76 and is connected to a crank arm 89 extending from a disk 90 mounted for rotation. To this disk is connected the rod 66.

A rod 91 is connected to the block 77 and is attached to a crank arm 92 extending from a disk 93 mounted for rotation. To this disk is connected the rod 56.

A rod 94 extends from the block 78 and is connected to a crank arm 95 projecting from a disk 96 and to this disk is secured the rod 46.

A standard 97 is supported above the plate 67 and pivotally mounted in this standard for universal movement is a shifting lever 98 on the lower end of which is telescopically mounted an extension 99 provided at its lower end with a foot 100 adapted to work within the grooves 80. It is to be understood that lever 98 can be provided with any suitable means, not shown, for holding it in any position to which it may be moved either forwardly, rearwardly or laterally.

Under normal conditions all of the blocks are positioned with their grooves 80 in alignment and opening upwardly through the block 68. Likewise the foot 100 is seated within one of the grooves. The clutches 12 and 18 are shifted by means of a lever provided therefor so that the two countershafts are thus driven at different speeds respectively. Should it be desired to throw the transmission into reverse the lever 98 is swung laterally a sufficient distance to bring the foot 100 into the block 78. The lever is then swung so as to thrust the block 78 along the channel 69. This will cause the disk 96 to rotate and thrust through rod 46 so as to shift the clutch 43 and couple the counter-shaft 37 to the gear 34. To throw the lever to any other position in order to shift the transmission it is first necessary to swing the lever so as to bring the block 78 back to normal position at the inner end of its channel 69. This obviously uncouples the counter-shaft 37 from the gear 34 and at the same time brings the lever in position where it can be shifted into any one of the remaining blocks. By moving the block 77 the transmission can be shifted to first speed. By shifting the block 76 the second speed can be attained and by moving the blocks 75 and 74 the third and fourth speeds respectively can be attained. Obviously, however, only one clutch can be shifted at a time and, therefore, there is no danger of injury to the mechanism such as would result should two clutches remain in active position at the same time.

As the gears are always in mesh the shifting of speeds can be effected noiselessly and without injury to any of the parts.

What is claimed is:—

1. In transmission mechanism a guide plate having a transverse channel, there being spaced longitudinal channels in the plate intersecting the transverse channel, blocks slidably mounted within the respective longitudinal channels for attachment to controlling clutches, each of said blocks having a transverse groove, all of the blocks being normally located across the transverse channel with the grooves in alignment, a shiftable lever and means carried by the lever and shiftable along the transverse channel for engagement with any one of the grooved blocks and shiftable with the lever to move the engaged block within the longitudinal channel.

2. The combination with a guide plate having a transverse channel and non aligning longitudinal channels opening into the transverse channel, of a block slidable in each longitudinal groove and normally positioned across the transverse channel, said blocks having transverse grooves normally aligning within the transverse channel, and operating member, means actuated thereby for movement along the transverse channel into the groove in any one of the blocks, and along the longitudinal channel of the engaged block to shift the block within the channel, and separate clutch operating means connected to the respective blocks.

3. In transmission mechanism the combination with separately movable controlling clutches, of a shifting lever mounted to swing in intersecting planes, an arcuate guide plate having a transverse channel concentric with the axis of the lever, there being spaced longitudinal channels in the plate intersecting the transverse channel, blocks slidably mounted within the respective longitudinal channels having transverse grooves therein, said blocks being normally positioned across the transverse channel with the grooves in alignment, means carried by the lever and shiftable along the transverse channel for engagement with any one of the grooved blocks, said lever being shiftable to move the engaged block within its longitudinal channel, and connections between the blocks and the respective clutches.

In testimony that I claim the foregoing as my own, I have hereto affixed my signature in the presence of two witnesses.

ALFRED E. MILARCH.

Witnesses:
J. S. GARFIELD,
A. SCHROEDER.